United States Patent [19]

Defour et al.

[11] Patent Number: 4,479,662
[45] Date of Patent: Oct. 30, 1984

[54] METHOD AND MEANS FOR ASSEMBLING THE PARTS OF CYCLE FRAMES AND THE LIKE

[75] Inventors: Paule Defour; Antoine Dumas, both of Loire, France

[73] Assignees: Angenieux CLB S. A.; Ateliers De La Rive, both of France

[21] Appl. No.: 324,446

[22] Filed: Nov. 24, 1981

Related U.S. Application Data

[63] Continuation-in-part of Ser. No. 234,625, Feb. 17, 1981, abandoned, which is a continuation of Ser. No. 54,962, Jul. 5, 1979, abandoned.

[30] Foreign Application Priority Data

Jul. 31, 1978 [FR] France ................. 78 23045

[51] Int. Cl.³ ................. B62K 19/06; B62K 19/22
[52] U.S. Cl. ................. 280/281 R
[58] Field of Search ........... 280/281 R, 274, 279, 280/280, 200; 156/294; 403/205, 295

[56] References Cited

U.S. PATENT DOCUMENTS

| 380,886 | 4/1888 | Hadley | 280/200 |
|---|---|---|---|
| 602,013 | 4/1898 | Ivins | 280/279 |
| 2,066,227 | 12/1936 | Reukauf et al. | 403/205 |
| 3,030,124 | 4/1962 | Holloway | 280/281 R |
| 3,100,555 | 8/1963 | Ashton | 52/655 |
| 3,498,866 | 3/1970 | Kilbane | 156/285 |
| 3,533,643 | 10/1970 | Yamada | 280/281 R |
| 3,854,831 | 12/1974 | Gutner | 403/295 |
| 3,937,641 | 2/1976 | Kushner et al. | 156/87 |
| 4,105,348 | 8/1978 | Anderson et al. | 403/295 |

FOREIGN PATENT DOCUMENTS

| 2245520 | 4/1975 | France | 280/281 R |
|---|---|---|---|
| 259026 | 10/1926 | United Kingdom | 280/281 R |
| 575144 | 2/1946 | United Kingdom | 280/281 R |

*Primary Examiner*—John A. Pekar
*Attorney, Agent, or Firm*—Eric P. Schellin

[57] ABSTRACT

A bicycle frame which can be easily assembled from frame elements. The frame elements are tubular and have hollow fittings having male assembly bearings with a decreasing taper section up to their ends.

12 Claims, 25 Drawing Figures

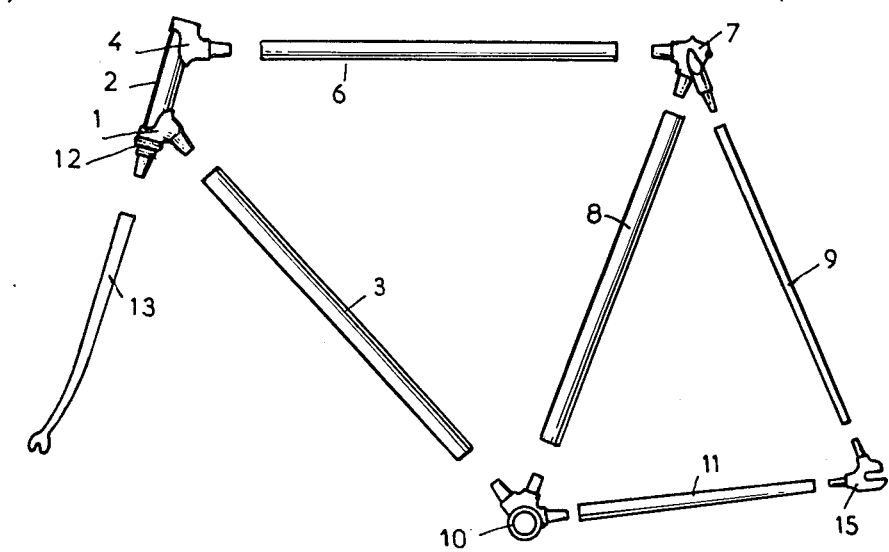
FIG.1
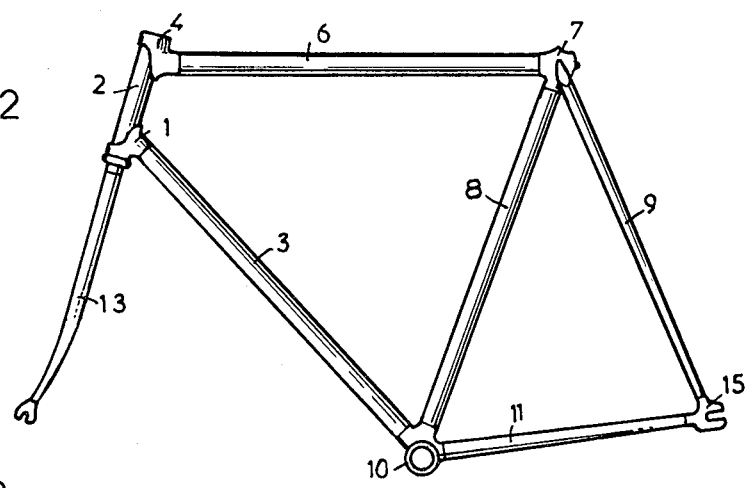
FIG.2
FIG.9
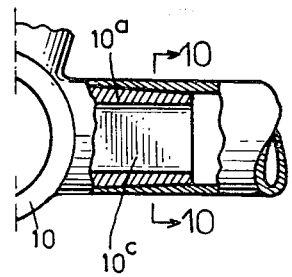
FIG.10
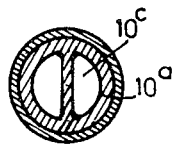
FIG.11
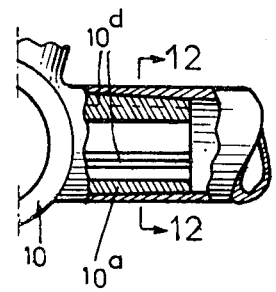
FIG.12
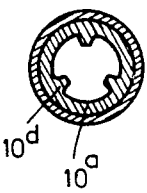

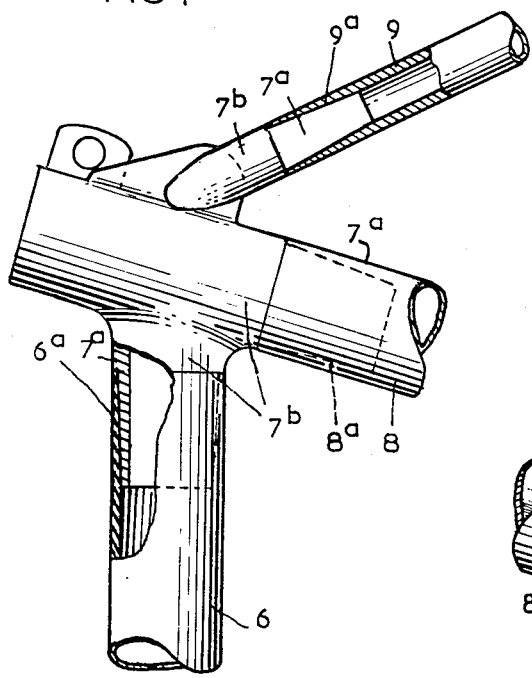
FIG 4
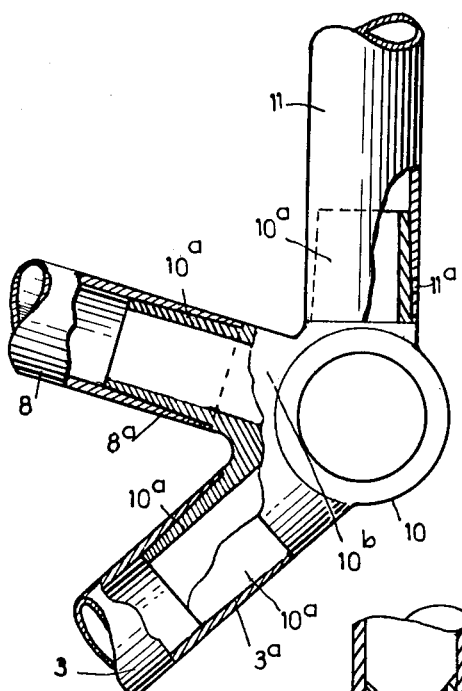
FIG 5
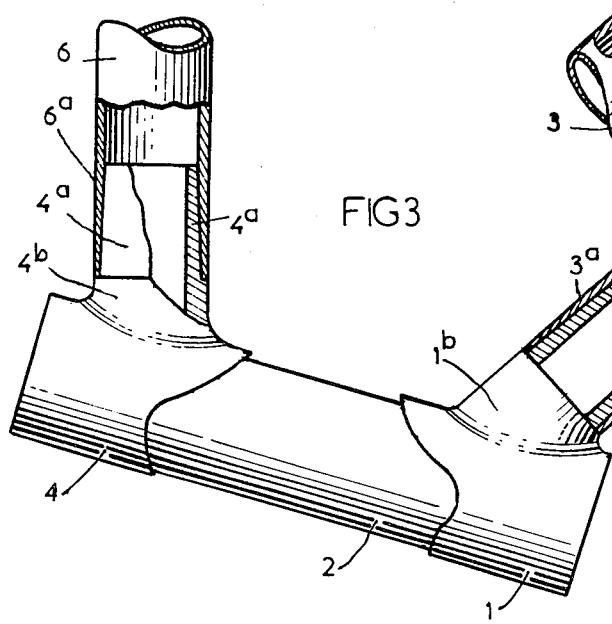
FIG 3
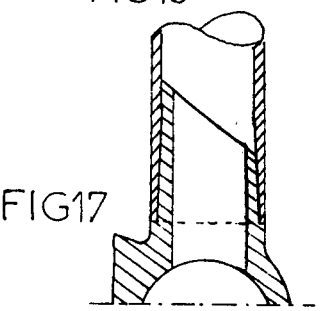
FIG 18
FIG 17

METHOD AND MEANS FOR ASSEMBLING THE PARTS OF CYCLE FRAMES AND THE LIKE

This is a continuation in part of Ser. No. 234,625, filed Feb. 17, 1981, now abandoned, which is a continuation of Ser. No. 54,962, filed July 5, 1979, and is now abandoned.

The present invention relates to a method and means for assembling the parts of cycle frames and the like, as well as cycles made using the method and means of the invention.

Generally, cycle frames are made of tubes, the ends of which are engaged and then secured by welding or soldering within fittings provided in the tubes. After assembly, the fittings form projections at the points of the frame toward which the tubes converge.

The disadvantage of this method of assembly is that the rough inside bearings of the fittings, which are generally made by casting, must be machined to provide a correct assembly of the tubes in the bearings of the fittings. In the case of fittings with a plurality of assembly bearings, as in the fitting of a crank-gear having four bearings, a special machine is needed to provide rational machining.

Another disadvantage is that the conventional bearings are weak, as finishing and ornamental cuts, and lightening cuts, are often formed at the foundry. The taperings and other cuts result in problems in machining the inside assembly bearings. Alternatively, when the tubes which are driven into the bearings of the fittings are secured by adhesive, the adhesive is pushed back and scraped when the tubes are driven into the hollow cylindrical bearings. The excess adhesive must be carefully removed from the cuts of the fittings before the frames are treated in drying ovens, requiring additional time in the assembly of the frame. Other disadvantages of this method include weakening of the fittings from the cutting, formation of catching and dust-accumulating points in fittings in decorated projections, and the difficulty and expense of assembling the frames.

It is therefore an object of the present invention to eliminate the above drawbacks. The method and means of the present invention provide the use of fittings which are generally hollow and have male assembly bearings with a decreasing taper section up to their ends and a larger section which is smaller than the section of the branch connections that are lengthened by the bearings. The corresponding ends of the tubes of the frame are secured adhesively by adapting them around the bearings the ends being formed with inside bearings with an increasing taper section up to the end corresponding to the male assembly bearings of the fittings.

In another embodiment, the inside bearings with an increasing taper section at the ends of the tubes of the frame are made by an inside as well as an outside forming of the tube ends which are enlarged without decreasing the thickness of the tubes in the assembly bearing thereof.

For a better understanding of the present invention and to show more clearly how it may be implemented, reference is made to the accompanying drawings.

FIG. 1 is a general view of the separated component parts, fittings, and tubes of a cycle frame in accordance with the invention. The component parts are shown in their assembly alignments.

FIG. 2 is a general view similar to FIG. 1, showing the assembly of the fittings and tubes of the frame.

FIG. 3 is a view in part section showing the method of assembly of two steering fittings and their tubes.

FIG. 4 is a view in part section showing a saddle shank fitting and the corresponding tubes.

FIG. 5 is a view in part section showing a crank-gear fitting and the corresponding tubes.

FIG. 6 is a view in part section showing a forkhead fitting and the corresponding tubes.

FIG. 7 is a view in part section showing a fitting for one rear limb of the frame and the corresponding tubes.

FIG. 8 shows an alternative embodiment of the steering fitting in a self-contained form providing both the assembly with the diagonal tube and the upper tube of the frame.

FIG. 9 shows a male bearing of a fitting having a reinforcing and stiffening cloth internally.

FIG. 10 is a cross section along line 10—10 of FIG. 9.

FIG. 11 shows a male bearing of a fitting have internally stiffening and reinforcing ribs.

FIG. 12 is a cross section along line 12—12 of FIG. 11.

FIGS. 13 and 14 are similar views showing the conditions for adhesively securing the male and female tapered assembly bearings of a fitting and of a tube in accordance with the invention.

FIGS. 15 and 16 are cross sections along line 15—15 of FIG. 6.

FIGS. 17 and 18 show the embodiments of an assembly wherein the end of the male bearing of the fitting is doubly cut in whistle form, simple or double.

Figure 18:
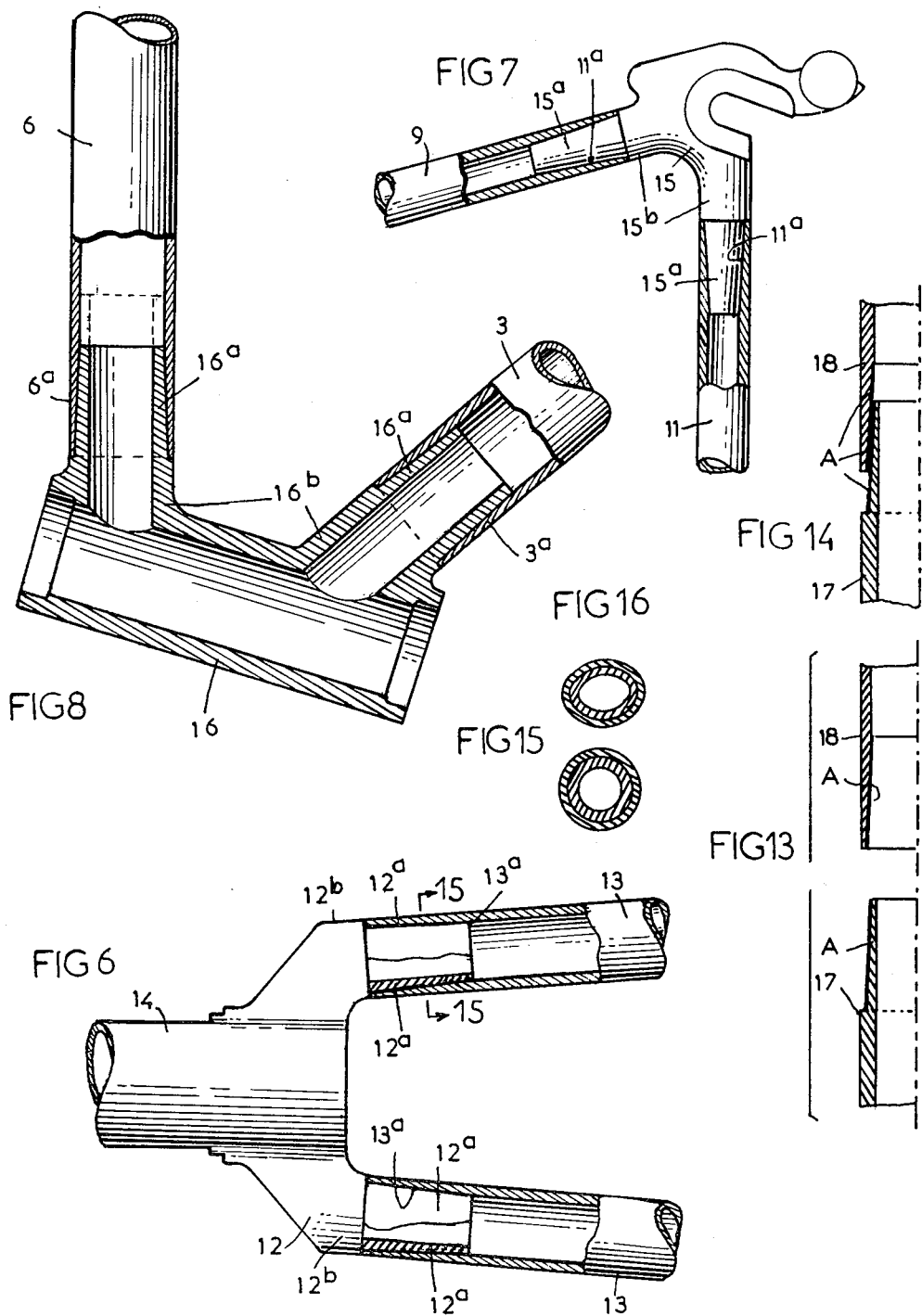

FIG. 3 shows the lower fitting 1 of the steering tube 2 of the frame with the diagonal tube 3 and the upper top 4 of the steering tube 2 of the frame with the upper tube 6 of the frame.

FIG. 4 shows the saddle fitting 7 of the upper tube 6 with the saddle tube 8 and with the bracing tubes 9 of the rear fork. The portion 7b of the fitting can be integral with fitting 7 or otherwise attached to this fitting, and can also be made in other forms.

FIG. 5 shows crank-gear fitting 10 with the diagonal tube 3, the saddle tube 8, and the tubes 11 of the horizontal rear fork.

FIG. 6 shows the fitting 12 (forkhead) of the tube 14 of the steering control with the tubes 13 of the front fork.

FIG. 7 shows the integral fitting 15 integral with or attached to the rear limb of the frame, as well as the bracing tube 9 and the tube 11 of the horizontal rear fork which are assembled together with fitting 15.

FIG. 8 shows an alternative embodiment, only one integral steering fitting 16 for the diagonal tube 3 and the upper tube 6.

According to the invention, the fittings may have one or more assembly conical male bearings, shown respectively at 1a, 4a, 7a, 10a, 12a, 15a and 16a. The section of these bearings is smaller than the connecting branches or forms, 1b, 4b, 7b, 10b, 12b, 15b, 16b, provided by the fittings. These forms are extended by and terminate in the conical bearings.

In a corresponding complementary manner, the assembly ends of tubes 3, 6, 8, 9, 11, 13 with these fittings have conical chambers or inside bearings 3a, 6a, 8a, 9a, 11a, 13a. The conical male bearings of the fittings and the conical inside bearings at the ends of the tubes have mating conicities in order to provide a correct abutment on the lengths of assembly.

In addition to the firm and reliable connection which is provided by the mutual engagement of the corresponding bearings, the securing of the fitting and tube assemblies according to the present invention is effected adhesively, in a strong and safe manner. Any convenient and well-known adhesive substance may be used, depending upon the nature of the metals, alloys, or other materials and substances which are used.

For example, it is possible to use a known adhesive product which is commercially available under the tradename Epoxy, a mono-component adhesive made by firing one of the following types in a drying oven: Redux 203, Prochal-EC2214, Minnesota 3M-Hexelite FX 114, Hexcel. However, it is also possible to use other commercially available adhesive products, for instance, those of the bicomponent type which polymerize at ambient temperature, provided that this polymerization is adapted for the materials to be assembled while assembly is carried out according to the invention.

By combining the male and female conical assembly bearings of the components of the frame, and by securing those components with adhesive to make the connection more strong, the adhesive effect is enhanced, and the fastening is thereby made fully effective and secure.

As illustrated in FIGS. 13 and 14, after the male conical bearings 17 and the female conical bearings 18 are assembled with an adhesive product A, the adhesive is "plastered" flat and wedged up, and the adhesive remains faultlessly distributed between the conical surfaces, rather than being pushed back or scraped, as in the case wherein cylindrical bearings coated with an adhesive product are fitted into each other. In the latter case, the adhesive fastening is not uniform, and there is some risk with regard to safety.

In accordance with the embodiments in FIGS. 17 and 18, configurations may be in the form of a single or double whistle at the end of the male conical bearings of the fittings to make engagement and penetration easier. It will be understood that, as the tapering shape of the male bearing and of the inside of the tube makes it possible to avoid the stress concentration processes which are harmful to the strength of the assemblies, the cut of the end in the form of a simple or double whistle permits the use of decreasing sections to avoid an abrupt change from a large to a small section, and thus obviating the possibility that the small section will give way under the operational stresses of the bicycle.

The male and female bearings, such as the bearings 12a and 13a of the forkhead and the front fork tubes shown in FIG. 15, as a whole may be oval rather than cylindrical, as shown in FIG. 16. This oval shape can be effected by using a device such as a press. It is also within the scope of the invention to provide other shapes of sections for the corresponding bearings of the fittings and tubes, such as triangular, polygonal, and the like, while always preserving the angular slants or forms in the axial direction for the bearings.

Another interesting feature of the invention is that some or all of the male conical bearings 1a, 4a, 7a, 10a, 15a, 16a, for example, at the crank-gear fitting which is subjected to considerable stresses, can be made with ribbed and reinforcing inside forms. As illustrated in FIGS. 9 and 10, the bearings 10a have a reinforcing "cloth" or diametral rib 10c formed in the general plane of the frame. In the embodiment of FIGS. 11 and 12, the bearings 10a are internally reinforced by several longitudinal ribs 10d. Three of these ribs have been shown by way of example. The ribs (or "cloths") 10c, 10d, and the like, are formed directly by molding when the fittings are made by casting methods. Of course, the ribs or reinforcing means may be provided inside the conical male bearings by other means.

Figure 23:
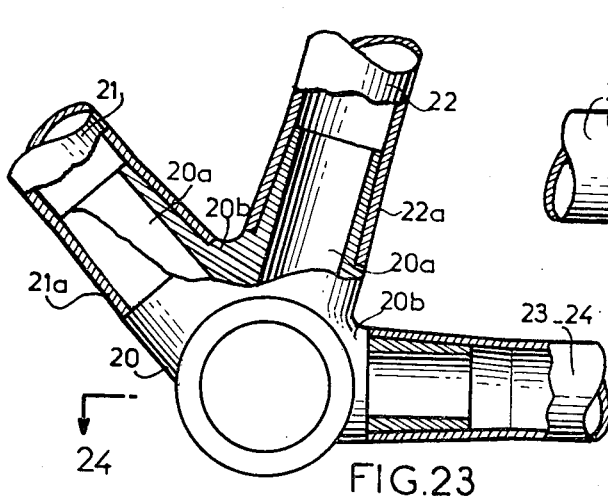
FIG. 23 is a front view, sectional in part, showing the means of assembly in accordance with the embodiment of a crank-gear fitting.
Figure 25:
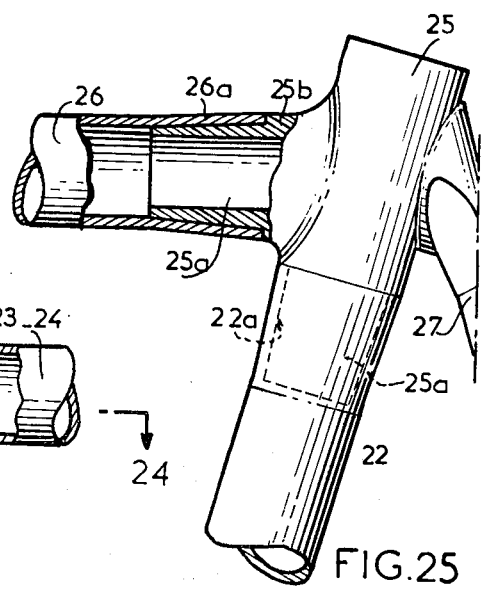
FIG. 25 is a front view, sectional in part, illustrating the means of assembly of a saddle shank fitting and the corresponding tubes.
Figure 24:
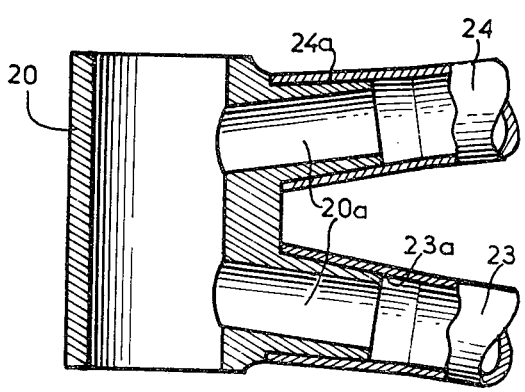
FIG. 24 is a sectional view along line 24—24 of FIG. 23.

FIGS. 23 and 24 show a fitting of crank-gear casing 20 with diagonal tube 21, saddle tube 22, and horizontal rear fork tubes 23 and 24. FIG. 25 shows saddle fitting 25 of the upper tubes 26 with saddle tube 22 and with the bracings 27 of the rear fork. In accordance with this embodiment, each fitting has one or more conical male assembly bearings, such as 20a, 25a, of smaller section than the connecting branches or forms 20b, 25b, with which the fittings are provided.

In a corresponding complementary manner, the assembly ends, with these fittings, of the tubes 21, 22, 23, 24, 26 and 27 have conical chambers or inside bearings 21a 22a, 23a, 24a, 26a and 27a.

Figure 21:
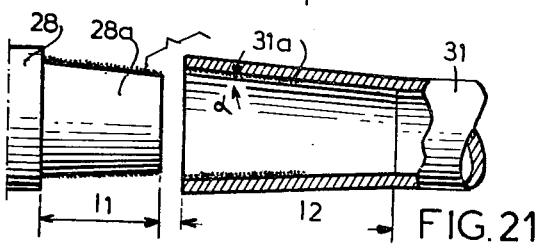
FIG. 21 is a sectional view of an embodiment of a tube assembly bearing prior to being adhesively secured to the male bearing of a fitting.

One important characteristic of this embodiment is that the inside bearings at the ends of the tubes are made by cold forming, more particularly by cold forming on a press. This forming is carried out inside as well as outside the ends of the tubes, which are thus enlarged, as shown in FIGS. 19 and 21, without decreasing the thickness of the tubes in the assembly bearings thereof.

It is understood that the conical male bearings of the fittings and the conical inside bearings which are established at the ends of the tubes have corresponding conicities to ensure a correct abutment on the lengths of assembly. For this purpose, the taper (FIGS. 19 and 21) can be substantially increased (possibly to use 3 degrees in series) to increase the relief angle of the cast workpiece independently of the thickness of the tube.

As stated previously, the male bearings 28a and the female bearings 29a are coated with an adhesive product A1 to ensure a faultless and reliable assembly, as shown in FIGS. 19, 20, 21 and 22.

Figure 19:
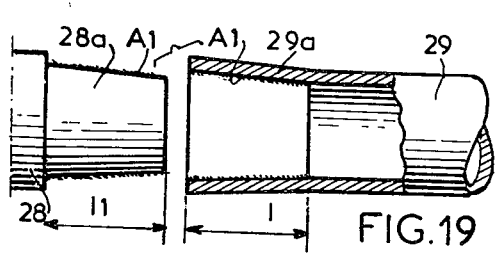
FIG. 19 shows in sectional view another embodiment of an assembly inside bearing of a tube prior to being adhesively secured to the male bearing of a fitting.
Figure 20:
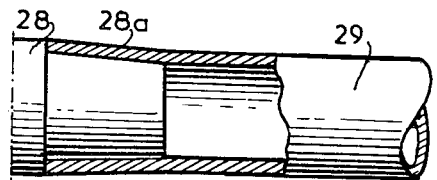
FIG. 20 is a view similar to FIG. 19 after adhesively securing the male and female conical bearings.

In the embodiment shown in FIGS. 19 and 20, the length of the inside bearings 29a at the ends of the tubes 29 is equal or substantially equal to the length of the male assembly bearings 28a of fittings 28.

Figure 22:
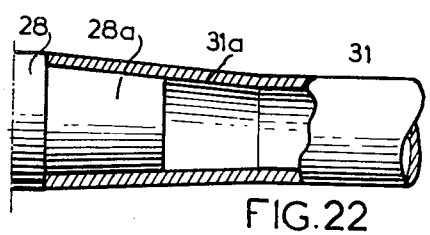
FIG. 22 is a view similar to FIG. 21 after the male and female bearings are adhesively secured.

In the embodiment of FIGS. 21 and 22, the length of the inside bearings 31a at the ends of tubes 31 is greater than the length l of the male assembly bearings 28a of fitting 28. These arrangements are advantageous in that they decrease the section of the tubes without impairing the strength of the tubes.

The above embodiment is particularly advantageous in the case of the crank-gear casing, which is a part of a bicycle frame subject to greater stress. As a matter of fact, the moment of inertia of the section of the assembly is inside the bearings at the ends of the tubes, this in spite of a possibility of a lightening cylindrical internal machining.

It will be obvious that all of the foregoing forms of embodiment apply to the latter form of embodiment.

It will also be noted that the finished frames give the impression that they have no fittings, as the outside sectional forms and dimensions of the tube ends correspond to the outside sectional forms and dimensions of the connecting branches.

The advantages and results of the method and means of the invention are as follows:

The conventional assembly fittings, wherein the tubes are driven in, have a tendency to be weak, as finishing and decorating cuts made with a view to reducing weight are often formed in the smelting works. The pointed portions and other cuts result in machining difficulties for the assembly of inside bearings.

The conical shapes at the inside ends of the tubes are easy to make, considering that these tubes are made of light alloy.

The so-called "duralumin" tubes of light metal which are used for manufacturing the cycle frames have a thickness of approximately 1.6 mm. After formation of the conical bearings, there remains approximately 1 mm at the thinner end, which is acceptable and does not impair safety.

The finished frames give the impression that they are not provided with any fittings, as the outside sectional shapes and dimensions of tubes 3, 6, 8, 13, 11, and 9 correspond to the outside sectional shapes and dimensions of connecting branches 1b, 4b, 7b, 10b, 12b, 14b, 15b, and 16b. The outline of the frame is therefore continuous, clean, and quite attractive. Bicycles made of frames without fittings, of the welded tube design are considered to be "top bracket" bicycles of the highest quality, the manufacture of which requires much time and craftmanship, and is therefore expensive. Consequently, there is no further need to embellish the fittings, thus obviating the inherent complications and sometimes questionable results, coupled with the risks of excessive cutting and harmful weakening of the fittings.

The manufacture of the fittings can be made more rational and can be done on an industrial scale. The fittings are ready for adhesive securing, and machining of the fittings can be omitted. It will be particularly noted that there is no screw thread in the fittings. Screw threads are expensive to make, and screw threaded sections are weaker.

The jointing line between the fittings and the tubes can be concealed easily and aesthetically by a mere fillet of paint or by a decorative line. It is possible to blend the shades of the metal or to contrast them by choice.

The integral steering fitting 16 permits a sectional profiled embodiment.

The length of the male assembly bearings can be increased as far as is useful without impairing the appearance of the frames, which is not the case with the well-known conventional fittings.

The enlarging of the ends of the tubes provides a cold hardening which is quite profitable for the strength of this overstressed section.

The moment of inertia of the assembly inside bearing section at the ends of the tubes is increased.

The assembled component parts need not necessarily be of light alloys or of metals of the same kind. The assembly of the component parts can be made with various metals, alloys, materials or substances, such as aluminum and plastics, aluminum and steel, aluminum and carbon fibers, and the like.

Likewise, the method and means of the present invention for assembling component parts can be used directly for tubular constructions or structures, more particularly for fittings which will provide a plurality of outgoing points for tubes such as framework joints, scaffolding, and the like.

The bicycle frame made according to the present invention is readily made from the component parts having fixed angles. No tightening means, such as bolts or the like, or brazing or soldering, are necessary to fix the component parts in position.

The finished frame is sufficiently strong to withstand the stresses to which it is exposed when the wheels of the bicycle are in contact with the ground. The frame according to the present invention is subjected to dynamic stresses during use, rather than static stresses as if it were a fixed structure.

The dynamic stresses to which the frame of the present invention has been subjected are fully outlined in "Compte Rendu d'Essai", a document furnished by a large cycle laboratory and submitted during the prosecution of applicant's prior application Ser. No. 54,962, filed July 5, 1979. Particularly on pages 21-25 of this document, the stress conditions to which a static structure is subject.

It should be noted that, in the bicycle frame of the present invention, simple joints are formed directly by perpendicular molding in the generating of a tubular cylindrical element to permit assembly of the tubes of the frame. There is no need to maintain the tubular elements in the desired position until the adhesive is set, as the tubular elements, by design, immediately upon assembly assume and maintain the desired position.

In summary, the bicycle frame of the present invention comprises frame elements made of lightweight material, each frame element comprising:

(a) joints comprising a hollow body of circular or oval cross section;

(b) one or more male or female bearings, wherein branches provide very precisely fixed angular positions;

(c) the conicity of the male bearings has a slope of three degrees.

The joints are easily assembled into a single frame.

The tubular elements of the frame are made of a lightweight material; open extremeties of the tubular elements have a slope of three degrees, which avoids excessive conicity and excessive deformation of the materials, and which conicity conforms to that of the male bearings.

The bicycle frame according to the present invention has been subjected to extensive testing for strength and durability. Technical documents showing results of research done on bicycle frames were submitted during the prosecution of applicants' parent case Ser. No. 54,962, filed July 5, 1979. Results of the tests described in these documents are highlighted below.

Document No. 1 is published by the Norme International 150 4210-1980, which defines safety regulations for bicycles. The frames according to the present invention conforms to these standards and have successfully passed the tests for resistance and durability. For example, the frame withstood the impact test described on page 15, FIG. 10.

The bicycle frame of the present invention also conforms to the specifications to the U.S. Consumer Product Safety Commission (Document No. 2).

The results of different tests are shown in Document No. 3 relative to tests of bicycle frames of lightweight alloys according to U.S. specification BMA/6 and the requirements of the U.S. Product Safety Commission. Referring to sheet no. 5 of this document, it can be seen that the conclusions are that the present results show that the elements subjected to the rest met the requirements the CPSC in the test of the assembled frame having several branches and a single branch. The frame met the requirements of specification BMA/6 with regard to resistance.

Document No. 4 shows the results of tests according to the Centre Technique des Industries M'ecaniqies (CETIM) with regard to fatigue under a frontal load on the bicycle. The results of these tests are summarized in comparative tables annexed to this document.

Document No. 5 relates to an abstract of a report of tests performed by a cycle laboratory. The results of this test are compared to a "standard bicycle". The tables on pages 4, 5, and 6 are comparisons of a standard frame (Reynolds) with a frame made according to Applicants' invention (VITUS979). It can be seen that the results obtained conformed to the advantages enunciated previously for the VITUS979 frame. On page 1 of this document appear the conclusions of this practical test under conditions defined on pages 21-25 of the document attached.

Document No. 6, "Mesure des Efforts en Marche Normale sur un Cadre de Bicyclette" shows clearly (page 91, FIG. 5) the efforts undergone by a frame in the course of dynamic tests. The four drawings each show underneath views and a drawing of the deformations of a frame made according to the present invention, established by a specific program. The dark lines correspond to the frame initially at rest, and the lighter lines show the deformations. Drawing No. 7 shows the torsion of the assembled frame VITUS979 of Applicants; the deformation (lighter lines) is multiplied by 100. Drawing No. 8 shows a test of the VITUS979 under pedaling conditions wherein the deformation (shown in lighter lines) is multiplied by 25.

Document No. 9 regroups a series of studies, the results, the tests, and comments made with regard to the bicycle frame according to Applicant's invention.

What is claimed is:

1. A bicycle frame comprising frame elements made of a lightweight tubular material, the frame elements comprising fittings and tubes, said fittings being hollow and having a circular or oval cross section for mounting and assembling the frame, the fittings having a plurality of conical male bearings having branches giving precise angular position, the fittings being made of a single piece of light metal alloy; the tubes being made of a light metal alloy and having at each extremity an opening with a conicity of pitch of about three degrees corresponding to the conicity of the male joints; wherein the ends of the tubes are secured adhesively to truncated bearings in the ends of the tubes;

the ends of the tubes for assembling the fittings to the tubes of the frame having inside bearings with an increase taper section up to the end corresponding to the male assembly bearings of the fittings;
the ends of the male bearings being conical and in the form of a whistle;
the sections of the male assembly bearings of the fittings and the sections of the inside bearings at the ends of the tubes may be circular, oval, triangular, or polygonal; and
at least one of the male conical bearings including inside reinforcing means.

2. The bicycle frame of claim 1 wherein the extremeties of the tubes are widened without diminution of the thickness of the tubes in the joints of the assembly.

3. The bicycle frame of claim 1 including at least one steering tube fitting, a saddle fitting, a crank-gear case fitting, a forkhead fitting, and a frame rear limb fitting, wherein each of said fittings has at least one male assembly bearing with a decreasing taper section up to the end thereof, the larger section of the bearing being smaller than the section of the connecting branches that are lengthened by the bearings.

4. The bicycle frame of claim 3 wherein the male assembly bearings of the fittings are conical and the inside bearings at the assembly ends of the tubes have conicity corresponding to the male assembly bearings.

5. The bicycle frame of claim 1 wherein the male assembly bearings of the fittings are conical and inside bearings at the assembly ends of the tubes have conicity corresponding to the male assembly bearings.

6. The bicycle frame of claim 1 wherein the reinforcing means is ribbing.

7. The bicycle frame of claim 1 wherein the inside bearings with an increasing taper section at the ends of the tube frames are made by both internal and external forming of the tube ends wherein the tube ends are enlarged without decreasing the thickness of the tubes in the assembly bearings.

8. The bicycle frame of claim 7 wherein the length of the inside bearings is substantially equal to the length of the male assembly bearings of the fittings.

9. The bicycle frame of claim 8 wherein the male assembly bearings of the fittings are conical and the inside bearings at the ends of the tubes have conicity corresponding to the male assembly bearings.

10. The bicycle frame of claim 7 wherein the length of the inside bearings is greater than the length of the male assembly bearings of the fittings.

11. The bicycle frame of claim 10 wherein the male assembly bearings of the fittings are conical and the inside bearings at the ends of the tubes have conicity corresponding to the male assembly bearing.

12. The bicycle frame of claim 7 wherein the male assembly bearings of the fittings are conical and the inside bearings at the ends of the tubes have conicity corresponding to the male assembly bearings.

* * * * *